Jan. 23, 1945.   E. H. GALE   2,367,767
METHOD OF MAKING DENTURES
Filed Jan. 27, 1940

Inventor
Edward H. Gale
by Charles H. Allen Attys

Patented Jan. 23, 1945

2,367,767

UNITED STATES PATENT OFFICE 2,367,767

METHOD OF MAKING DENTURES

Edward H. Gale, Chicago, Ill.

Application January 27, 1940, Serial No. 315,947

2 Claims. (Cl. 18—55.1)

This invention relates to a method of molding dentures comprising unplasticized acrylic resins without tin-foiling the mold.

Heretofore all acrylic resins molded into dentures have been plasticized before molding. The resulting plasticizer content of the acrylic resins entails serious disadvantages, which have heretofore been thought to be inherent characteristics of acrylic resins. It is necessary, for instance, to seal the porous plaster molds used against entry of moisture by lining the same with tin foil, as access of even a trace of moisture to the plasticized resins during molding would discolor the finished dentures badly. The formation of bubbles in dentures is also probably due to the presence of plasticizers in the resins. Dentures prepared from plasticized acrylic resins are further incapable of being sterilized in boiling water, being liable to warp even at the temperatures and under the moisture conditions prevailing in the oral cavity.

The appended drawing illustrates the methods of the present invention for molding unplasticized acrylic resins without tin foiling the mold. More particularly:

The following description of the conventional method of molding an upper denture from plasticized acrylic resins will show the relative importance and cost of the tin foiling operation as compared with the other steps of this process.

Figure 1:
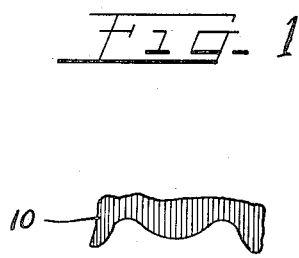
Figure 1 is a transverse cross-sectional view of a female impression of the toothless gums and hard palate of an upper jaw as made by a dentist.
Figure 2:
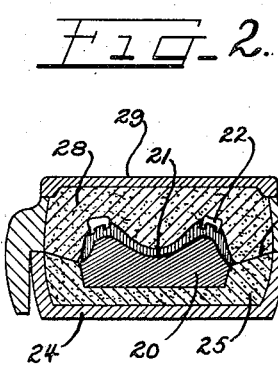
Figure 2 is a transverse cross-sectional view of a structure representing an intermediate stage in the preparation of a plaster mold for unplasticized acrylic resins not to be lined with tin foil.
Figure 3:
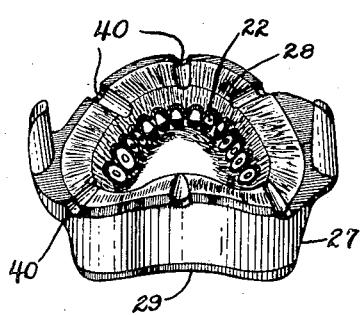
Figure 3 is a perspective view of the inside of the upper half of a plaster mold for unplasticized acrylic resins not lined with tin foil.
Figure 4:
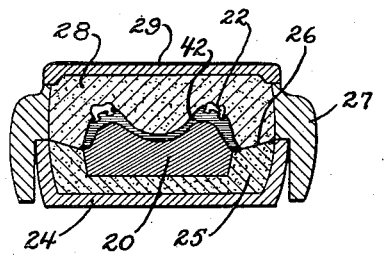
Figure 4 is a transverse cross-sectional view of a plaster mold not lined with tin foil packed with an unplasticized acrylic resin.
Figure 5:
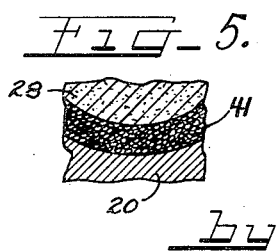
Figure 5 is a fragmentary greatly enlarged cross-sectional view of a granular unplasticized acrylic resin packed in a plaster mold not lined with tin foil.

A conventional molding method starts with a female impression of the toothless gums and hard palate of the upper jaw made by the dentist. Such a female impression is illustrated in Figure 1 and there designated with the reference numeral 10.

From this female impression a male mold in hard dental plaster is prepared. The concavity of this male mold corresponding to the hard palate and the ridges duplicating the toothless gums are then covered to suitable depths with wax and teeth are set into the wax on the ridges in proper alignment and with proper projections from the wax. The surface of the wax is then shaped manually or with a suitable instrument to conform to the contours of a normal hard palate end of normal dentigerous gums. The thus prepared and waxed male mold together with the teeth aligned thereon is known as a "waxed up denture."

The wax of the waxed up denture together with thereto adjacent marginal parts of the male mold and teeth are then covered with tin foil and the latter is burnished so as to close all openings in the tin foil including the most minute pores and pinholes.

The waxed up denture, with its tin-foiled side up, is then placed in the relatively wider and shallower cup formed by the lower portion of a flask and invested there with plaster. The tin-foiled portion of the denture projects above the edge of the bottom portion of the flask. The annular top of the plaster surrounding the waxed up denture is trimmed flush with the edges of the tin foil, and separating fluid is applied to the top surface of the trimmed plaster, to prevent adhesion of additional plaster to be applied thereon in a subsequent step.

The upper open-topped portion of the flask is then put in place over the lower portion of the flask, and the flask is completely filled with plaster which covers the trimmed surface of the investing plaster in the lower portion of the flask, the tin-foiled waxed portion of the waxed up denture and the teeth projecting from the waxed ridges of the denture. When this plaster hardens, it grips the teeth projecting thereinto and the tin foil also adheres thereto.

The lid of the flask is then put over the upper portion of the flask and tapped down lightly. The flask is immersed in boiling water for 15 to 20 minutes to melt and remove the wax. The removal of the wax leaves a cavity between the upper surface of the male mold invested in the lower portion of the flask and the tin-foil covered lower surface of the plaster in the upper portion of the flask which plaster is separable from the investing plaster in the lower portion of the flask. The root portions of the teeth held by the plaster in the upper portion of the flask project through the tin foil into this cavity.

The upper and lower portions of the flask together with plaster adhering to each are then separated. Residual wax is removed from the cavity with hot water. That portion of the surface of the male mold which had been covered with wax and surfaces adjacent thereto are then covered with tin foil and the latter is burnished. The final result is a two-membered plaster mold or case whose molding surfaces are lined with a moisture proof layer of burnished tin foil.

Acrylic resins for use in conventional molding processes are available both as plasticized sheets and as granular products which are intermixed with plasticizer and worked with a pestle in a mortar to form a plastic mass immediately before use.

Such acrylic resins which according to conventional methods invariably are plasticized in one way or another are packed in the cavity of the case lined with tin foil. The case is then placed in a hand press and exposed to heat and pressure in the presence of moisture for a suitable length of time. The mold is then cooled, taken apart, and the denture removed therefrom.

The total time required for manipulation in the conventional molding process amounts to from 1 hour and 30 minutes to 1 hour and 40 minutes. The tin-foiling and burnishing step requires from 20 to 40 minutes of this time.

The present invention departs radically from the teaching of the prior art that acrylic resins must be plasticized for denture molding purposes by providing a method of molding dentures from unplasticized solid acrylic resins. This process, contraindicated by the prior art, has the surprising effect of rendering unnecessary the tin-foiling step thought by the prior art to be an unavoidable handicap to the molding of dentures from acrylic resins and yields also, contrary to what the prior art thought possible, a denture characterized by such resistance to moist heat as to be capable of being sterilized by immersion in boiling water. Methods according to the present invention further include optional employment of dry heat in molding, involving temperatures and pressures far in excess of those previously employed, but still not accompanied by the cracking or checking of the teeth of the dentures which occurred at the lower temperatures and pressures of the prior art methods. Dentures prepared according to the present invention are moreover distinguished by great density and mechanical strength. Such dentures, for instance, may be dropped without danger of breaking. As a matter of fact, the unplasticized acrylic resin is so tough as to be more resistant to mechanical shocks than the porcelain teeth of the denture.

The present invention further provides methods of molding dentures from unplasticized acrylic resins without the use of tin foil involving the wetting of the resins with relatively volatile and inert liquids which at ordinary temperatures do not render the resins plastic. Carbon tetrachloride is a typical example of such a liquid, the use of which makes it possible to mold unplasticized acrylic resins at lower temperatures and pressures than otherwise necessary.

It is therefore an important object of the present invention to provide a method of making dentures comprising unplasticized acrylic resins.

Another important object of this invention is to provide a method of molding dentures from acrylic resins in plaster molds without tin-foiling the molds used.

Yet another object of the invention is to provide a method of molding dentures from acrylic resins wetted by relatively volatile and inert liquids incapable of plasticizing said resins at ordinary temperatures as typified by carbon tetrachloride.

Other and further important objects of the present invention will become apparent to those skilled in the art from the following description and thereto appended claims.

The principles of the present invention are illustrated by the following examples of practical embodiments thereof. Numerous other applications will suggest themselves to those skilled in the art.

EXAMPLE I

*Warm pack; semi-dry heat cure*

A waxed up denture is prepared according to the conventional method but the denture is not tin-foiled. This waxed up denture is invested as described hereinabove, the investing plaster being trimmed flush with the edges of the wax, and a plaster impression thereof is made by the use of the open-topped portion of the flask as also described hereinabove.

Figures 2, 3, 4 and 5 illustrate specific methods of this example and show a male mold 20, wax 21, teeth 22, a lower portion 24 of a flask, plaster 25 in this lower portion 24 having a trimmed top surface 26, an upper portion 27 of the same flask, plaster 28 in this upper portion 27, and a lid 29 for the flask.

The wax is eliminated from the two-membered mold or case thus obtained, the cavity is washed with acetone, and five or six spaced waste gates 40 are provided in the mold by cutting registering small recesses in and across the facing edges of the two plaster casts. These waste gates open into the cavity of the mold. The male mold is not tin-foiled after the elimination of the wax.

The acrylic resin employed is the polymerized acrylic ester known under the trade name "Crystalite M-100" and is sold by Rohm and Haas Co., Inc., of Philadelphia, Pennsylvania. This resin is distinguished by a specific gravity of 1.18 to 1.19, a specific heat of 0.4 to 0.5 calories per degree of centigrade per gram, and a refractive index of about 1.49.

One ounce of suitably dyed or pigmented granular "Crystalite M-100" is mixed with one-half ounce of carbon tetrachloride until the resin granules are thoroughly wetted and the mixture has the consistency of wet sand. The carbon tetrachloride not adsorbed on the resin particles as a wetting coating collects on the bottom of the container.

While the flask is still warm, the cavity in the plaster in the open-topped portion of the flask is packed full with resinous granules 41 (Figure 5) wetted with carbon tetrachloride which are pastified at the temperature of the mold. The pastified resin is designated in Figure 4 by the reference numeral 42. A sheet of wet Cellophane is optionally placed over the resin, to make the upper surface of the denture smooth. The male die is put in place, the flask, which should still be warm, is assembled and put in a hand press. The press is tightened slowly, to avoid losses of material from the cavity by the gushing out of carbon tetrachloride through the waste gates. The flask is then put in a dry heat electric press under a slowly increasing pressure. When after about 20 minutes carbon tetrachloride vapors and steam cease to escape through the waste gates, the full pressure of the press is turned on, so that the flask is completely closed. The flask is kept under a pressure amounting to upwards of 3000 pounds at a temperature of about 300° F. for, say, 20 minutes. The flask is then removed from the electric press, placed in a hand press, allowed to cool somewhat, immersed in cold water, and the denture is removed and finished.

While the flask is in the electric press, the acrylic resin is molded into the desired shape and all carbon tetrachloride is eliminated therefrom. In spite of the absence of tin foil and the free access of moisture adsorbed by the porous plaster mold, the resulting denture is not discolored and is free from bubbles. The denture is further much stronger mechanically than prior art dentures molded from plasticized acrylic resins, not given to warping and capable of being sterilized by immersion in boiling water.

This particular method is designated as involving semi-dry heat and hot packing as a moderate amount of moisture is present in the mold during the heating step and the resin is packed into the mold while the latter is hot, the wetted resin being pasty at this elevated temperature.

EXAMPLE II

*Warm pack; hot water cure*

A mold is prepared as in Example I. While the mold still is warm, the mold cavity is packed with suitably pigmented or dyed granular acrylic resin "Crystalite M-100" which has been wetted with a mixture of 80 per cent carbon tetrachloride and 20 per cent acetone to form a mass having the consistency of wet sand. A sheet of Cellophane can be placed over the resin before the male mold is telescoped thereinto. The mold flask is inserted in a hand press and immersed in a vessel of boiling water for about 40 minutes. The flask is then removed from the vessel, cooled, opened and denture removed.

The resulting denture is not discolored, is free from bubbles, is capable of being sterilized by immersion in boiling water and is distinguished by great mechanical strength.

EXAMPLE III

*Warm pack; dry heat cure*

A mold is prepared as in Example I and thereafter dehydrated thoroughly by suitable heating. While the mold is still warm, the mold cavity is packed with suitably pigmented or dyed granular acrylic resin such as "Crystalite M-100." The male mold is telescoped into the mold cavity, the flask is assembled and inserted into an electric press and there exposed to a temperature of about 340° F. to 360° F. and a pressure of upwards of 3000 pounds for about 10 minutes. The flask is then removed from the electric press, placed in a hand press and then cooled. The denture is removed after cooling is complete.

The resulting denture is not discolored, is free from bubbles, is capable of being sterilized by immersion in boiling water and is distinguished by exceptional density and mechanical strength.

As shown by these examples, the present invention comprises the molding of unplasticized granular masses of acrylic resins. These unplasticized masses may be treated with liquids that wet the granular resins and while not rendering the resins plastic at ordinary temperatures still serve to lower the temperature at which the resins turn pasty. These liquids are herein designated as "pastifying liquids." The above examples mention the following pastifying liquids: carbon tetrachloride, a mixture of 20 per cent acetone and 80 per cent carbon tetrachloride. Other pastifying liquids include mixtures of 10 per cent butyl acetate and 90 per cent carbon tetrachloride, of 10 per cent toluene and 90 per cent carbon tetrachloride, of 10 or 20 per cent trichlor ethylene and 90 or 80 per cent carbon tetrachloride, of 50 per cent acetone and 50 per cent carbon tetrachloride and many others. Straight ethyl ether is too volatile while toluene per se is not volatile enough. In general, pastifying liquids according to this invention include non-polymerizable liquids which do not render acrylic resins plastic at ordinary room temperatures, which are not so volatile as to be eliminated prior to the heat cure, but which are sufficiently volatile to be eliminated completely during the heat cure and which serve to make acrylic resins pasty at elevated temperatures.

The function of the pastifying liquids is shown more clearly by the "cold pack" molding methods of this invention. In these methods the mold prepared as in Example I is allowed to cool before the resin wetted with, say, carbon tetrachloride is packed in the mold cavity. The wetted resin is placed in a glass vessel and the vessel is dipped in hot water, whereby the resinous mixture is made pasty. The pasty resin is then packed in the mold cavity and molding is carried out as in Example I.

In molding, high temperature may compensate for less intense pressure, and vice versa, while a prolonged less intense treatment may be substituted for a shorter more intense treatment.

While this invention is applicable to acrylic resins proper which include the resinous polymerization products of acrylic acid and its esters, and, in particular, to the polymerized esters, the invention is particularly applicable to the resinous polymerization products of methacrylic acid and its esters. The term "acrylic resin" as used herein designates both acrylic acid and methacrylic acid derivatives.

The present invention may therefore be broadly characterized as comprising the molding of dentures of unplasticized acrylic resins and methods of preparing such dentures including molding unplasticized acrylic resins in plaster molds immediately contacted by the molded resin, thus eliminating the conventional tinfoiling of plaster molds. The molding according to this invention also includes optional use of pastifying liquids.

The prior art is familiar with the molding of acrylic resins in metallic molds and, in the case of molded dentures, with the molding of acrylic resins in molds lined with burnished tin foil. The present invention, on the other hand, presents a radical innovation in the art of molding acrylic resins by providing molding methods in which the acrylic resins are exposed to the action of heat and pressure while in immediate contact with the walls of porous plaster molds permitting the access of moisture.

As pointed out hereinabove, various details of the present invention may be varied through a wide range without departing from the principles of the invention and it is, therefore, not the purpose to limit the patent granted hereon otherwise than necessitated by the scope of the appended claims.

I claim as my invention:

1. In a method of making a molded denture which comprises subjecting an acrylic resin to the action of heat and pressure in immediate contact with a plaster mold, the step comprising wetting said resin with carbon tetrachloride before subjecting said resin to said action of heat and pressure.

2. In a method of making a molded denture which comprises subjecting an acrylic resin to the action of heat and pressure, the step comprising wetting said resin with carbon tetrachloride before subjecting said resin to said action of heat and pressure.

EDWARD H. GALE.